United States Patent [19]

Peeples

[11] 4,111,495
[45] Sep. 5, 1978

[54] LOAD SENSING PROPORTIONER WITH PROPORTIONER DELAY

[76] Inventor: Denny L. Peeples, New Carlisle, Ohio

[21] Appl. No.: 810,972

[22] Filed: Jun. 29, 1977

[51] Int. Cl.² .......................... B60T 8/00; B60T 8/18
[52] U.S. Cl. ..................................... 303/6 C; 188/349
[58] Field of Search .......................... 188/349; 303/6 C

[56] References Cited

U.S. PATENT DOCUMENTS

| | | | |
|---|---|---|---|
| 3,329,471 | 7/1967 | Oberthur | 303/22 R |
| 3,362,758 | 1/1968 | Goerke et al. | 303/22 R |
| 3,467,440 | 9/1969 | Strien | 303/6 C |
| 3,733,106 | 5/1973 | Rike et al. | 303/6 C |
| 3,804,468 | 4/1974 | Ishikawa et al. | 188/349 X |

Primary Examiner—George E. A. Halvosa

Attorney, Agent, or Firm—D. D. McGraw

[57] ABSTRACT

A brake actuating pressure proportioning valve is positioned in a vehicle rear brake circuit. The valve is sensitive to vehicle load to change the rear brake pressure point at which proportioning begins. The valve is also sensitive to front brake circuit pressure. If a significant decrease of front brake circuit pressure occurs, a delay piston is moved to follow the proportioner piston to a predetermined extent. In this condition the delay piston keeps the proportioner from operating in a proportioning mode, permitting full rear brake circuit pressure to be delivered without proportioning action. The delay piston is spring loaded to permit a significant pressure delay in proportioning action before it is moved toward its original position with increasing rear brake circuit pressure.

1 Claim, 3 Drawing Figures

U.S. Patent    Sept. 5, 1978    4,111,495
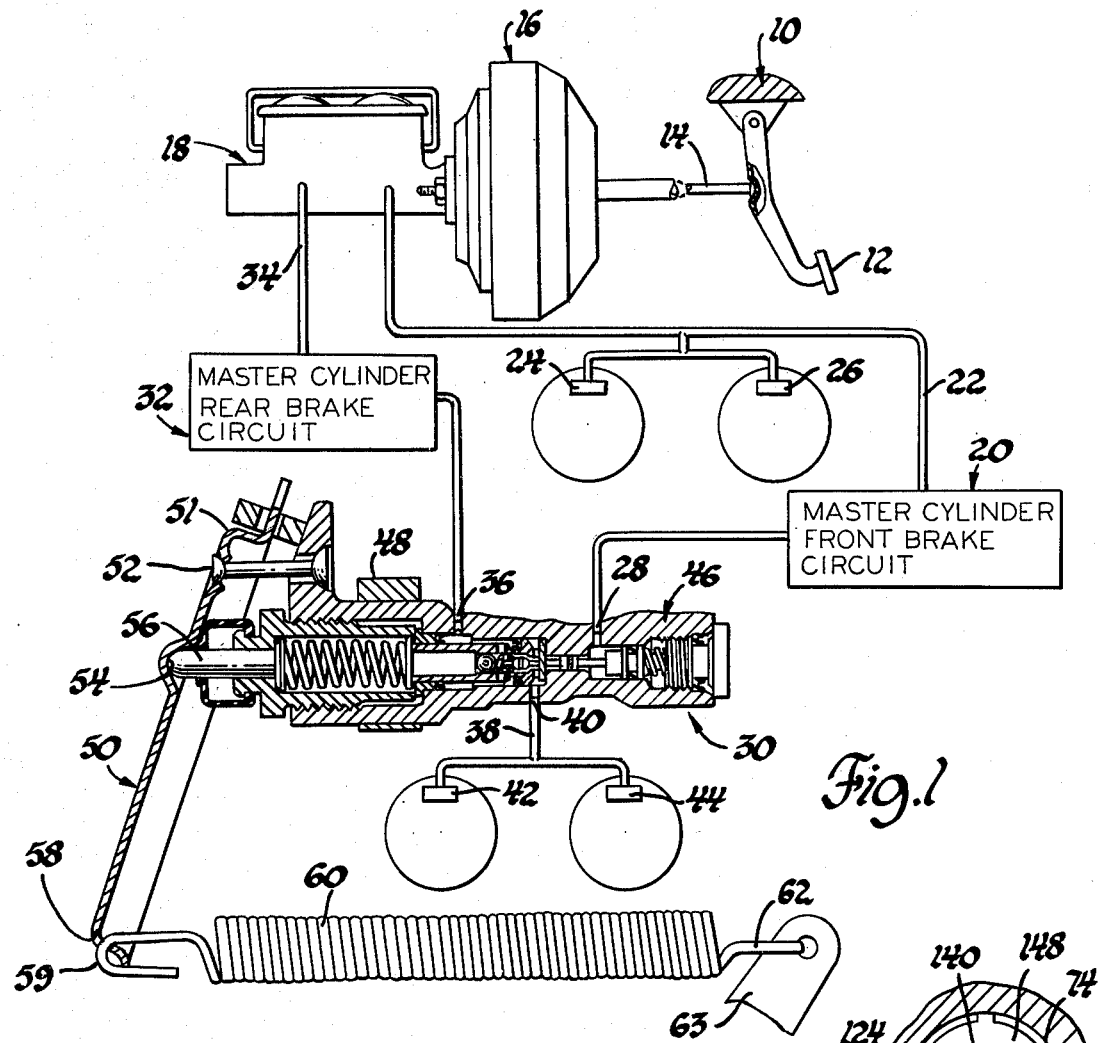
Fig.1
Fig.3
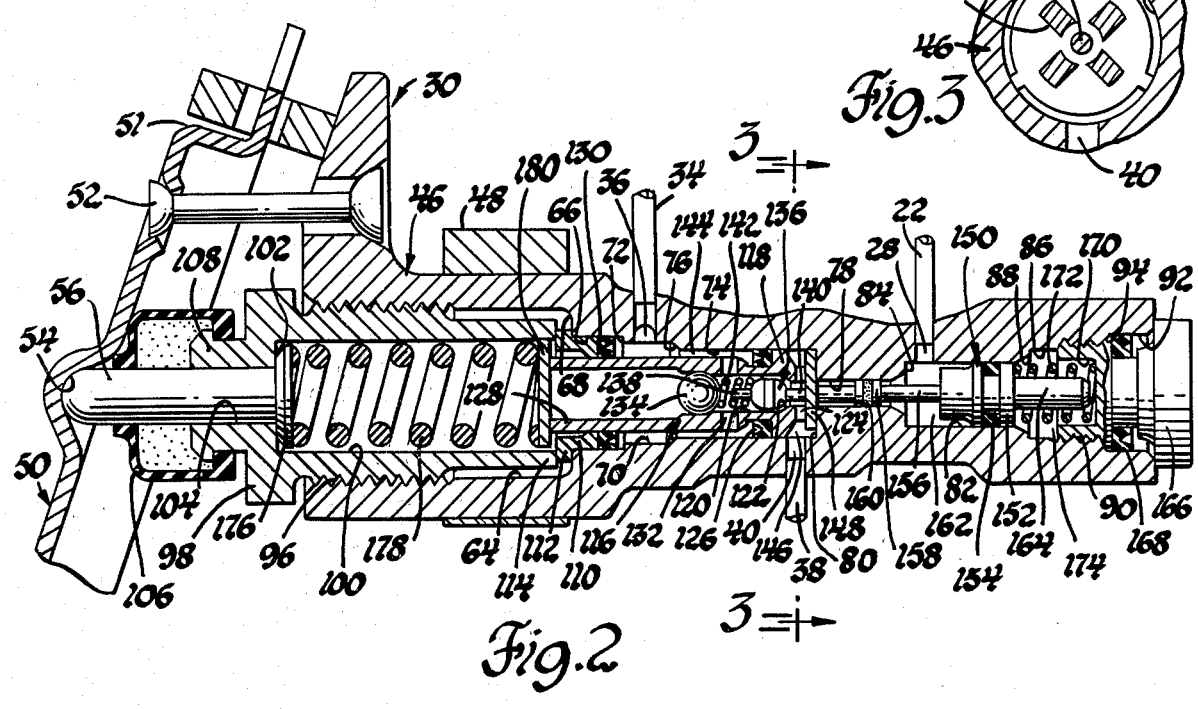
Fig.2

LOAD SENSING PROPORTIONER WITH PROPORTIONER DELAY

The invention relates to a proportioning valve assembly and more particularly to one which operates on vehicle rear brake circuit pressure and senses the vehicle front brake circuit pressure. The proportioner is preferably sensitive to vehicle load and under normal operating conditions will begin brake proportioning within a predetermined rear brake pressure range which may be on the order of 100 to 400 psi depending on the amount of vehicle load. If the front brake circuit has a substantial pressure loss or no pressure whatsoever when the brake system is actuated, a spring loaded delay piston moves to prevent proportioning action until a significantly greater rear brake circuit pressure has occurred. This may be about 700 psi in a system having a brake circuit runout pressure of approximtely 1,000 to 1,200 psi. The delay is proportioning operation of the proportioner occurs by having the delay piston travel in a following relationship with the proportioner piston when the significant front pressure loss has occurred, keeping the proportioner valve open and providing continued uninhibited flow through the proportioner. Only when the rear brake circuit pressure has built up significantly beyond the normal range of proportioning initiation does the delay piston move away from the proportioner valve to a sufficient extent to allow that valve to be seated and proportioning action to begin.

IN THE DRAWING

FIG. 1 is a schematic illustration of a vehicle dual circuit brake system with a proportioner embodying the invention shown in cross section.

FIG. 2 is an enlarged cross section view, with parts broken away, of the proportioner of FIG. 1.

FIG. 3 is a cross section view taken in the direction of arrows 3—3 of FIG. 2.

The brake system for the vehicle 10 is somewhat schematically illustrated as including a brake pedal 21 pivotally mounted on a portion of the vehicle and having a push rod 14 connected thereto which operates the brake booster 16, in turn operating the dual master cylinder 18. The front brake circuit 20 includes a conduit 22 leading from one pressurizing chamber of master cylinder 18 to the front brakes 24 and 26 and also leading to a port 28 of proportioner 30. The rear brake circuit 32 includes a conduit 34 leading from the other pressurizing chamber of master cylinder 18 to a port 36 of proportioner 30. Another conduit 38 is connected with a port 40 of proportioner 30 and leads to the rear brakes 42 and 44.

The proportioner 30 has a housing 46 which is secured to a sprung portion of vehicle 10 by mounting bracket 48. A load control arm 50 is so attached to proportioner 30 as to be sensitive to vehicle load conditions to modify the proportioner as will be described. Arm 50 is attached adjacent one end 51 to the proportioner housing by a pivot 52, has a socket 54 receiving the outer end of the proportioner plunger 56, and at its other end 58 is attached to one end 59 of spring link 60. The other end 62 of spring link 60 is connected to an unsprung portion of the vehicle 63. The load sensing lever system may be of the type disclosed in greater detail in U.S. patent application Ser. No. 740,794, filed Nov. 11, 1976, now Pat. No. 4,060,283, entitled "Brake Actuating Pressure Proportioning System and Proportioner Modifying Arm Therefore," and assigned to the common assignee. Essentially, load control arm 50 pivots counterclockwise around pivot 42 with increasing vehicle load through a predetermined vehicle load range to urge plunger 56 rightwardly.

Proportioner 30 has a bore provided through housing 46 with several bore sections of several different diameters, described next in relation to the immediately precedingly recited bore section. The bore sections include a relatively large diameter section 64 opening toward load control arm 50, an intermediate diameter bore section 66 separated from bore section 64 by shoulder 68, a somewhat smaller bore section 70 separated from bore section 66 by a shoulder 72, a still smaller bore section 74 separated from bore section 70 by a shoulder 76, a substantially smaller bore section 78 separated from bore section 74 by shoulder 80, a somewhat larger bore section 82 separated from bore section 78 by a shoulder 84, a slightly larger bore section 86 separated from bore section 82 by a shoulder 88, the outer portion of bore section 86 being internally threaded as shown at 90, and a somewhat larger bore section 92 opening through the other end of housing 46 from bore section 64 and having a shoulder 94 separating it from the threaded portion 90 of bore section 86.

The outer end of bore section 64 is threaded at 96 and receives a plug 98 therein. The plug 98 has a bore 100 with its larger diameter end opening toward bore section 66, a shoulder 102 adjacent the other end thereof, and a smaller diameter bore section 104 through which plunger 56 extends. A boot 106 is suitably secured to the outer end 108 of plug 98 and fits over plunger 56 to seal bore section 104 against entry of foreign particles.

A flanged annular seat and guide member 110 is received within bore section 66 so that its flange 112 is in bore section 64 and engages shoulder 68. The end 114 of plug 98 tightly engages the other side of flange 112 and holds member 110 in position. The proportioning piston 116 is reciprocably received in the housing bore as described below. Piston 116 has a head 118 at its right end, and a bore 120 extending through the piston terminating at head 118 to form a valve seat 122. The outer side of head 118 is castellated as shown at 124. The other side of head 118 has an annular V-block seal 126 postioned thereagainst. Head 118 and seal 126 are reciprocably received in bore section 74. The main body 128 of proportioner piston 116 is of smaller diameter than head 118 and extends out of bore section 74 through bore sections 70 and 66, and then through seat and guide member 110. A V-block seal 130 is positioned within bore section 66 against the end of member 110 with its inner periphery sealing proportioner piston main body 128. A cross passage 132 extends through the portion of piston main body 128 adjacent seal 126 and opens into bore 120 at a location axially between valve seat 122 and a ball type plug and spring seat 134 closing the left portion of bore 120 from the right portion thereof. A proportioning valve 136 is positioned within bore 120 axially between valve seat 122 and plug 134. The valve has a body of somewhat smaller diameter than bore 120 to permit flow about the body so long as the body is not seated on valve seat 122. Oppositely extending valve pin end 138 and 140 are positioned on opposite sides of the body of valve 136. Pin end 138 is engageable with seat 134 upon sufficient leftward, valve opening, movement of valve 136. Pin end 140 extends through the castellated portion 124 of proportioner piston head 118. A valve spring 142 is placed about pin end 138 and seats on plug and spring seat 134 at one end and on the main body of valve 136 at its other end. Spring 142 continually urges the valve 136 toward engagement with valve seat 122. An annular chamber 144 is defined by bore sections 70 and 74 about proportioner piston main body 128 axially between seals 126 and 130. Port 36 opens into this chamber. The seals 126 and 130 are oriented to hold pressure in chamber 144. Another chamber 146 is defined by proportioner piston head 118, the right end of bore section 74, and shoulder 80. Port 40 opens into this chamber. A seat 148 is positioned in chamber 146 with one side engaging shoulder 80 and the other side engaged by castellated end 124 of proportioner piston head 118. This other side is also engaged by proportioner valve pin end 140.

A delay piston 150 is reciprocably received in bore sections 82 and 86. Piston 150 has a land 152 with a seal 154 thereon slidably sealing against the cylinder formed by bore section 82. The left end of piston 150 is a pin 156 extending into bore section 78 and has a land 158 reciprocably received in bore section 78. A seal 160 on land 158 slidably seals against the cylinder formed by bore section 78. The leftward end of pin 156 engages seat 148 on the same side of the seat that engages shoulder 80. A chamber 162 is formed by bore section 82 and a portion of bore section 78 axially between seals 154 and 160. Port 28 opens into this chamber.

The right end of delay piston 150, as seen in FIG. 2, is a pin section 164 extending through bore section 86. A plug 166, with a V-block seal 168, is threaded into the threaded portion 90 of bore section 86 so that the seal 168 seals against the cylinder formed by bore section 92 to prevent entry of foreign material while venting chamber 174. The head of plug 166 bottoms on the outer end of housing 46. The inner end of plug 166 is recessed at 170. Pin section 164 extends into this recess, and the delay piston spring 172 is positioned about pin section 164 with one spring end seating against the bottom of recess 170 and the other spring end seating on land 152. A chamber 174 is defined in bore section 86 axially between land 152 and plug 166.

The load sensing plunger 56 has a head 176 in bore 100 and engageable with shoulder 102 in the position shown. This is the light load position of plunger 56. A compression spring 178 is positioned within bore 100 with one end engaging a spring seat 180 which also engages the left end of proportioner piston main body 128. Thus the force of spring 178 is always exerted on proportioner piston 116 and must be overcome before the proportioning piston can begin to move leftwardly. It can be seen that with load control arm 50 moving counterclockwise about its pivot 52, the load on spring 178 will be increased as vehicle load is increased, therefore requiring a higher pressure in the proportioner before proportioning piston 116 can move leftwardly to begin proportioning action.

In normal operation, as brake pressure is generated in master cylinder 18, rear brake pressure is delivered to chamber 144 through conduit 34 and port 36. It passes through cross passage 132 into the right end of proportioner piston bore 120 and flows past valve 136, through valve seat 122, and into chamber 146. It then flows out port 40 to conduit 38 and is delivered to the rear brakes 42 and 44 at an undiminished pressure. At the same time, front brake pressure is delivered to chamber 162 through conduit 22 and port 28 and this pressure urges delay piston 150 rightwardly to hold the piston in this position against the force of spring 172. When the pressure in chamber 146 is sufficient, due to the differential areas of proportioner piston head 118 and the proportioner piston main body 128, the proportioning piston 116 will move leftwardly against the force of spring 178, moving valve seat 122 into engagement with valve 136 and closing the connection between chambers 144 and 146. From this point onward, as rear brake pressure increases, proportioning action will take place and the rear brake pressure delivered to brakes 42 and 44 will be a proportionately smaller amount as compared to the brake pressure generated in the master cylinder chambers and delivered to conduits 22 and 34.

If there is a substantial loss of pressure in the front brake circuit 20, this loss is sensed by delay piston 150, allowing the delay piston to be moved leftwardly by spring 172. This keeps the left end of delay piston pin 156 in engagement with seat 148, keeping the seat against the castellated end 124 of proportioning piston head 118 and also holding valve 136 in the open position relative to valve seat 122. Thus full rear brake pressure is delivered to conduit 38 undiminished by proportioning action. This pressure acts on the delay piston land 158 and end of pin 156 over the area of bore section 78. When it generates a sufficient force on delay piston 150, it overcomes the force of delay piston spring 172 and moves the delay piston rightwardly away from proportioner piston 116. Spring 142 can then expand, moving valve 136 rightwardly to engage its valve seat 122 and begin proportioning action since seat 142 is no longer held against the castellated end 124 of piston head 118. This pressure preferably occurs at a significantly higher pressure than the normal pressure range at which proportioning begins. By way of example, proportioning action can begin with light vehicle load at about 100 psi rear brake circuit pressure through a range including full vehicle load at about 400 psi rear brake pressure. However, it can require about 700 psi rear brake pressure to move delay piston 150 rightwardly when there is no front brake pressure in chamber 162. Thus the delay piston allows a significantly higher rear brake pressure to be delivered to the rear brakes before proportioning action begins when there is little or no front brake pressure generated. So long as front brake pressure is being generated in a normal manner substantially comparable to rear brake pressure, the delay piston is held rightwardly out of operative position.

What is claimed is:

1. In a brake pressure circuit proportioner having
a housing having first and second pressure receiving ports respectively capable of receiving pressure from first and second brake pressure circuits for actuating first and second brakes, a pressure outlet port for delivering brake actuating pressure to the first brake, a proportioning piston and a proportioning valve positioned fluidly intermediate said first pressure receiving port and said outlet port, said valve being normally open to allow substantially uninhibited pressure therethrough from said first port to said outlet port, said piston acting upon a pressure increase to a first predetermined first port pressure to move relative to said valve to close said valve and thereafter proportion pressure at a predetermined ratio from said first port to said outlet port as pressure further increases at said first port, the improvement comprising:
a movable seat engaged by said proportioning piston and said valve when said valve is normally open, and disengaged from said proportioning piston when pressure is being proportioned; a spring-biased proportioning delay piston normally biased to an inactive position by pressure in said second port but moved under the spring-bias force upon loss of pressure in said second port and operatively engaging said valve and said proportioning piston through said seat to move said valve concurrently with said proportioning piston when and as said proportioning piston moves, keeping said valve normally open and continuing to allow substantially uninhibited pressure therethrough from said first port to said outlet port until pressure at said outlet port acting on said proportioning delay piston reaches a second predetermined first port pressure and overcomes the spring-bias force acting on said proportioning delay piston and moves it operatively away from said valve and said proportioning piston and said seat, permitting said valve to move said seat relative to said proportioning piston to close said valve and institute proportioning action, said second predetermined first port pressure being sufficiently greater than said first predetermined first port pressure to assure a substantially higher level of first brake actuating pressure before proportioning begins when there is no second brake actuating pressure.

* * * * *